United States Patent
Hui et al.

(10) Patent No.: US 9,678,370 B2
(45) Date of Patent: Jun. 13, 2017

(54) CARRIER-DEPLETION BASED SILICON WAVEGUIDE RESONANT CAVITY MODULATOR WITH INTEGRATED OPTICAL POWER MONITOR

(71) Applicants: IMEC VZW, Leuven (BE); Universiteit Gent, Ghent (BE)

(72) Inventors: Yu Hui, Hangzhou (CN); Wim Bogaerts, Melle (BE)

(73) Assignees: IMEC VZW, Leuven (BE); Universiteit Gent, Ghent (BE)

( * ) Notice: Subject to any disclaimer, the term of this patent is extended or adjusted under 35 U.S.C. 154(b) by 81 days.

(21) Appl. No.: 14/338,564

(22) Filed: Jul. 23, 2014

(65) Prior Publication Data

US 2015/0316795 A1 Nov. 5, 2015

(30) Foreign Application Priority Data

Jul. 23, 2013 (EP) .................................... 13177675

(51) Int. Cl.
*G02F 1/025* (2006.01)
*G02F 1/01* (2006.01)
*G02F 1/313* (2006.01)

(52) U.S. Cl.
CPC ............ *G02F 1/025* (2013.01); *G02F 1/0121* (2013.01); *G02F 1/3132* (2013.01); *G02F 2201/58* (2013.01); *G02F 2203/15* (2013.01)

(58) Field of Classification Search
None
See application file for complete search history.

(56) References Cited

U.S. PATENT DOCUMENTS

| 2002/0145139 A1* | 10/2002 | Wagner | H01L 31/03682 257/53 |
| 2003/0072009 A1* | 4/2003 | Domash | G02B 6/29311 356/519 |
| 2012/0074367 A1* | 3/2012 | Costa | H01L 27/1021 257/2 |
| 2014/0110572 A1* | 4/2014 | Li | G01J 1/0209 250/227.23 |

OTHER PUBLICATIONS

Yu, Hui et al., "Using Carrier-Depletion Silicon Modulators for Optical Power Monitoring", Optics Letters, vol. 37, No. 22, Nov. 15, 2012, pp. 4681-4683.
Tu, Xiaoguang et al., "Fabrication of Low Loss and High Speed Silicon Optical Modulator Using Doping Compensation Method", Optics Express, vol. 19, No. 19, Sep. 12, 2011, pp. 18029-18035.

* cited by examiner

*Primary Examiner* — Uyen Chau N Le
*Assistant Examiner* — Chad Smith
(74) *Attorney, Agent, or Firm* — McDonnell Boehnen Hulbert & Berghoff LLP

(57) ABSTRACT

A carrier-depletion based silicon waveguide resonant cavity modulator includes a silicon waveguide based resonant cavity. The resonant cavity includes an optical modulation section and an optical power monitoring section. The optical power monitoring section includes an integrated lateral PIN diode including a doping compensated I region having a high defect density and a low net free carrier concentration. The doping compensated I region may be formed by performing a P-type implantation step and an N-type implantation step with overlapping ion implantation windows.

9 Claims, 3 Drawing Sheets

CARRIER-DEPLETION BASED SILICON WAVEGUIDE RESONANT CAVITY MODULATOR WITH INTEGRATED OPTICAL POWER MONITOR

CROSS-REFERENCE TO RELATED APPLICATION

This application claims priority to European Patent Application No. 13177675.9 filed on Jul. 23, 2013, the contents of which are hereby incorporated by reference.

FIELD

The present disclosure is related to carrier-depletion based silicon waveguide resonant cavity modulators having an integrated optical power monitor, and to methods for fabricating such resonant cavity modulators with an integrated power monitor.

A carrier-depletion based silicon waveguide resonant cavity modulator of the present disclosure may be integrated on a silicon photonics platform without the need for additional process steps.

BACKGROUND

An objective of silicon photonics is to integrate different functionalities, including wavelength multiplexing and de-multiplexing, routing, optical emission, modulation, and detection on a silicon based platform, such as a silicon-on-insulator (SOI) based platform.

A compact, power-efficient and high-speed integrated silicon modulator is a key building block of silicon photonics. The carrier-depletion modulator is becoming a preferred solution for electro-optic modulation in silicon, because of its compatibility with complementary metal-oxide semiconductor (CMOS) process technology, its processing simplicity, and its high operation speed.

For example, a carrier-depletion based micro-ring modulator may comprise a micro-ring resonator with an integrated PN junction. The micro-ring can be coupled to a neighboring waveguide. The resonant wavelength may be modified by tuning the effective refractive index of the micro-ring waveguide. Tuning is obtained by reverse biasing the PN junction integrated with the micro-ring.

Due to its resonant nature, the micro-ring modulator has the advantages of compact size, low power consumption, and low driving voltage. However, a drawback of this structure is that optical modulation occurs only within a narrow wavelength range near the resonance wavelength. A typical optical bandwidth of effective modulation is less than 0.1 nm.

Further, a silicon waveguide is very sensitive to temperature variations. For example, a change in the ambient temperature of 1° C. results in a shift of the resonance wavelength of a silicon micro-ring modulator by about 0.1 nm. This makes the silicon micro-ring modulator very sensitive to any temperature fluctuation.

Therefore, a silicon micro-ring modulator generally needs to be integrated with a dynamic thermal stabilization system. Such dynamic thermal stabilization system may include a heater to change the temperature, a feedback circuit to control the heater power, and an optical power monitor that monitors the ring dynamics and that provides a feedback signal to the circuit controlling the heater power.

The 1.12 eV band gap of silicon makes it transparent in the telecom wavelength band around 1.55 μm. In order to enable monitoring of the optical power inside a silicon micro-ring modulator, several solutions have been proposed, such as: integration of a Germanium photodetector by eptiaxial growth; bonding of a III-V semiconductor based photodetector; or using a dedicated ion implantation step (typically Si+ implantation) to introduce lattice defects in the silicon waveguide in a predetermined area. These lattice defects may lead to defect-state mediated sub-bandgap absorption and result in the generation of a photocurrent. While the observed effect is generally much weaker than in case of direct absorption in a Ge or III-V photo-detector, it is an advantage of this approach that the functionality may be implemented relying exclusively on silicon carrier-depletion modulation without adding processing steps.

A silicon micro-ring modulator wherein defect-state mediated absorption is used for integrated power monitoring has been described by Hui Yu et al. in "Using carrier-depletion silicon modulators for optical power monitoring", Optics Letters Vol. 37, No. 22, 2012. A micro-ring resonator with a lateral PN junction is described, wherein the PN junction is embedded in an SOI waveguide by ion implantation. After ion implantation, a rapid thermal annealing (RTA) may be performed at a temperature above 1000° C. to activate the dopants and to repair damage in the silicon lattice without causing much dopant redistribution. Still, there may remain some residual crystal defects that can mediate sub-bandgap absorption. It is shown that, after being heated to 1075° C., a reverse-biased PN diode still produces a substantial photocurrent, based on defect-mediated absorption in the ion-implanted SOI waveguides. This photocurrent is used as a power monitor feedback signal. This means that the widely utilized carrier-depletion modulator may also be used for optical power monitoring without any additional processing. For example, a small section of a PN-junction-embedded ring may be used to monitor the optical power inside the ring. It is suggested that the responsivity of both the modulator and the monitor may be enhanced by using an interdigitated PN junction instead of a lateral PN junction, to enlarge the overlap between the optical mode and the carrier-depletion region, or by reducing the RTA temperature to increase the crystal defect density.

SUMMARY

The present disclosure aims to provide a carrier-depletion based silicon waveguide resonant cavity modulator with an integrated optical power monitor based on defect-mediated sub-bandgap absorption, wherein the power monitor has a good responsivity, and wherein the power monitor may be integrated without the need for additional processing steps and without introducing any additional absorption materials. The present disclosure further aims to provide a method for fabricating such resonant cavity modulator with an integrated power monitor.

The present disclosure is related to a carrier-depletion based silicon waveguide resonant cavity modulator that includes a silicon waveguide based resonant cavity. In an example, the resonant cavity has an optical modulation section and an optical power monitoring section. The optical modulation section may include an integrated lateral PN diode, and the optical power monitoring section may include an integrated lateral PIN diode comprising a doping compensated I region having a high defect density and a low net free carrier concentration.

In the context of the present disclosure, the term "PIN diode" refers to a diode having a p-type semiconductor region (P) and an n-type semiconductor region (N), with therein between a semiconductor region (I) having a net doping concentration that is lower than the net P-type doping concentration of the P region and lower than the net N-type doping concentration of the N region. In embodiments of the present disclosure, the doping compensated region (I region) may be an intrinsic region or a near intrinsic region, or it may be a lowly doped p-type region or a lowly doped n-type region.

In operation, when light propagates through the resonant cavity silicon waveguide, free photo-carriers may be generated in the PIN diode through defect mediated absorption, resulting in a photocurrent. The photocurrent is a measure for the optical power inside the resonant cavity and may be used as a feedback signal to a circuit controlling a heater power.

In a fabrication process of a carrier-depletion based silicon waveguide resonant cavity modulator of the present disclosure, the doping compensated region may for example be formed by performing a P-type implantation step using a first implantation window and by performing an N-type implantation step using a second implantation window, with overlapping first and second ion implantation windows at the location where the doping compensated region is to be provided. The same ion implantation steps as used in the fabrication of the optical modulation section of the carrier-depletion based modulator may be used to realize the in-waveguide optical power monitor. Therefore, a PIN photodiode wherein photocarriers are generated through defect mediated absorption may be obtained inside a waveguide based resonant cavity using the same process flow as used for fabricating the carrier-depletion based modulator.

In embodiments of the present disclosure, the waveguide resonant cavity may for example comprise a micro-ring resonator or a Fabry-Pérot cavity, the present disclosure not being limited thereto.

It is a potential advantage of devices and methods of the present disclosure that there is no need for using non-silicon photoactive materials, such as Ge or III-V semiconductor materials, to enable optical power monitoring.

It is a potential advantage of devices and methods of the present disclosure that the doping compensated region may have a high defect density, resulting in a good photocurrent (good responsivity) through defect mediated absorption, while having a low net free carrier concentration, thus avoiding or reducing undesired free carrier absorption losses.

It is a potential advantage of devices and methods of the present disclosure that there is no need for additional processing steps to realize the PIN photodiode. The processing of the PIN photodiode is fully compatible with the processing of the silicon carrier-depletion modulator. Therefore, the power monitor (PIN diode) may be integrated without additional cost.

It is a potential advantage of embodiments of the present disclosure that the optical power monitor may be provided directly inside the waveguide based resonant cavity modulator, thus leading to a reduced complexity of the photonics circuit.

Certain objects and advantages of various inventive aspects have been described hereinabove. Of course, it is to be understood that not necessarily all such objects or advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein. Further, it is understood that this summary is merely an example and is not intended to limit the scope of the disclosure. The disclosure, both as to organization and method of operation, together with features and advantages thereof, may best be understood by reference to the following detailed description when read in conjunction with the accompanying drawings.

Figure 1:
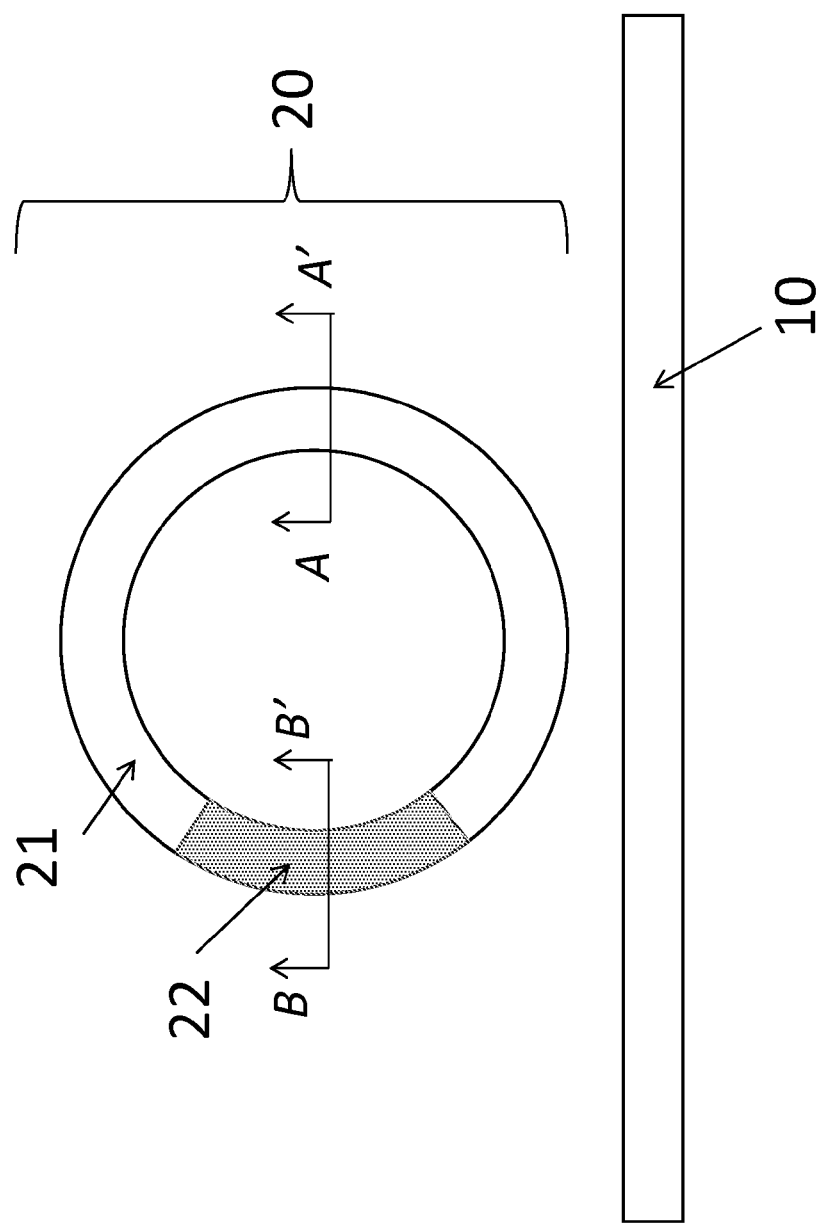
FIG. 1 schematically illustrates a micro-ring comprising an optical modulation section and an optical power monitoring section in accordance with an embodiment of the present disclosure.

Any reference signs in the claims shall not be construed as limiting the scope of the present disclosure.

In the different drawings, the same reference signs refer to the same or analogous elements.

DETAILED DESCRIPTION

In the following detailed description, numerous specific details are set forth in order to provide a thorough understanding of the disclosure and how it may be practiced in particular embodiments. However, it will be understood that the present disclosure may be practiced without these specific details. In other instances, well-known methods, procedures and techniques have not been described in detail, so as not to obscure the present disclosure.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

The term "comprising", used in the claims, should not be interpreted as being restricted to the means listed thereafter; it does not exclude other elements or steps. Rather, it should generally be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

The present disclosure relates to a carrier-depletion based silicon waveguide resonant cavity modulator with an integrated optical power monitor based on defect mediated carrier absorption, wherein the power monitor has an improved responsivity as compared to prior art power monitors, and wherein the power monitor may be integrated without the need for additional processing steps and without introducing any additional absorption materials.

The present disclosure is further described for embodiments wherein the silicon waveguide resonant cavity modulator is a silicon micro-ring modulator. However, the present disclosure is not limited thereto. The silicon waveguide resonant cavity may for example be a Fabry-Pérot cavity or any other suitable cavity known by a person skilled in the art.

FIG. 1 schematically illustrates a micro-ring modulator according to an embodiment of the present disclosure (top view). The modulator comprises a first waveguide 10, which may for example be a straight waveguide as shown in FIG. 1, the present disclosure not being limited thereto, and a second waveguide 20 having a micro-ring shape, the second waveguide 20 being optically coupled to the first waveguide 10 by evanescent coupling. The micro-ring waveguide 20 comprises an optical modulation section 21 and an optical power monitoring section 22.

In the example shown in FIG. 1, the second waveguide 20 has a ring shape. However, the present disclosure is not limited thereto and any other suitable (closed) shape known to a person skilled in the art may be used for second waveguide 20, such as for example a racetrack shape or a rectangular shape with rounded corners.

In embodiments of the present disclosure, the first waveguide 10 and the second waveguide 20 (e.g. micro-ring) may for example have a silicon core layer and silicon oxide cladding layers. For example, the waveguide core may be formed in the device layer of an SOI substrate. However, the present disclosure is not limited thereto and other suitable material combinations may be used.

In embodiments of the present disclosure, the micro-ring modulator is a carrier depletion-based modulator with an integrated PN junction.

Figure 2:
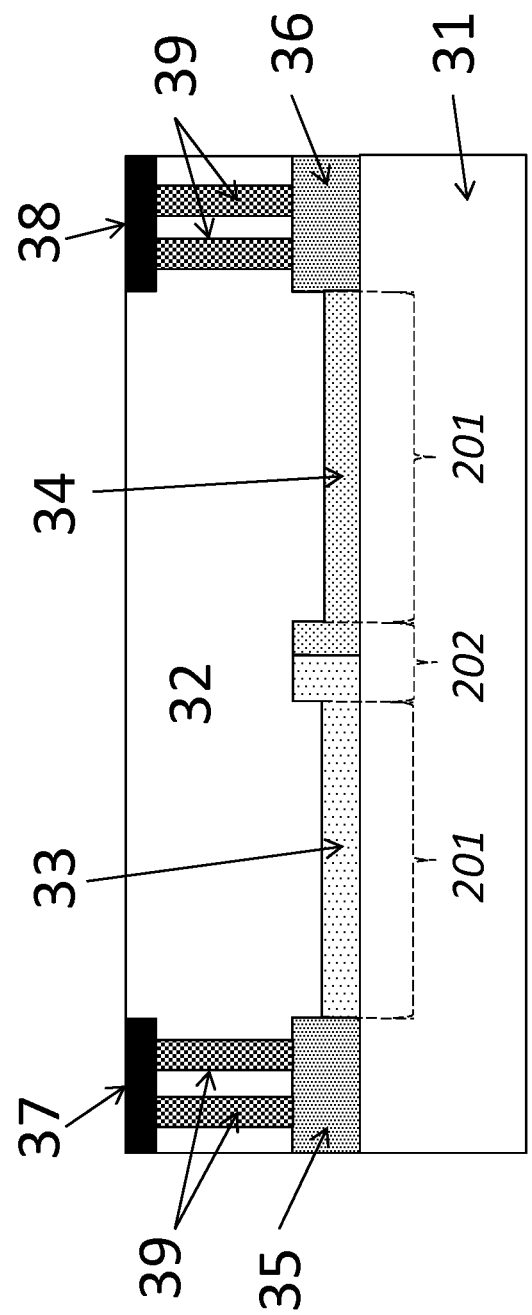
FIG. 2 schematically shows a cross section along line A-A' (FIG. 1) of the optical modulation section of a micro-ring according to an embodiment of the present disclosure.
Figure 3:
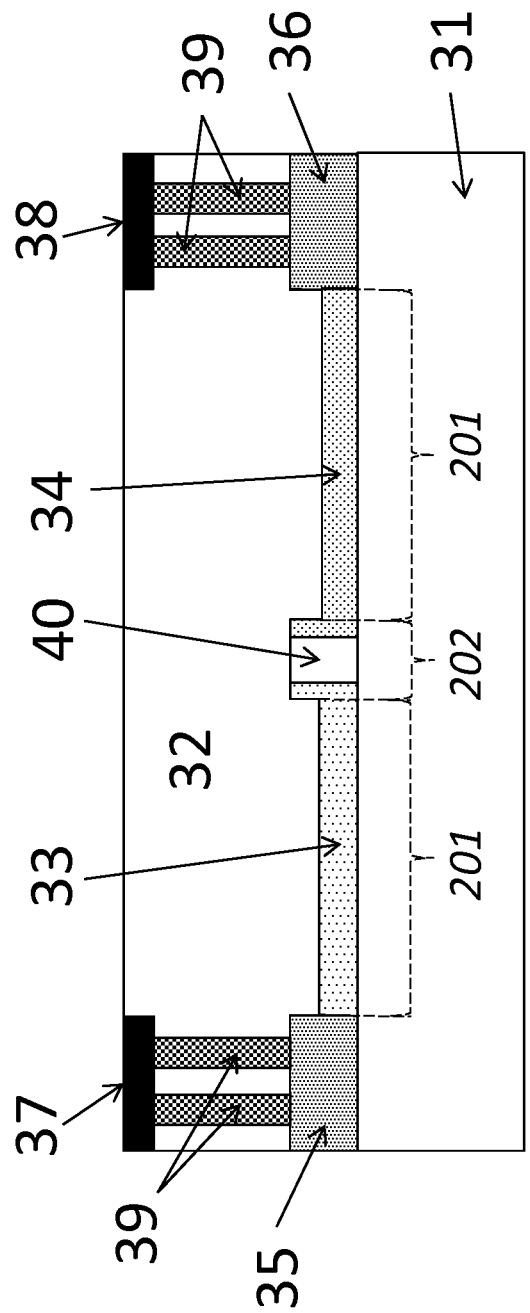
FIG. 3 schematically shows a cross section along line B-B' (FIG. 1) of the optical power monitoring section of a micro-ring according to an embodiment of the present disclosure.

FIG. 2 shows a cross-section along line A-A' (optical modulation section 21) and FIG. 3 shows a cross-section along line B-B' (optical power monitoring section 22) of the micro-ring waveguide 20 of FIG. 1. In the example illustrated in FIG. 2 and FIG. 3, the micro-ring waveguide is a rib waveguide, containing slab portions 201 (shallow etched portions) and a strip portion 202 (unetched portion) wherein light may be confined. The core of the micro-ring waveguide 20 is stacked between a lower cladding layer 31 and an upper cladding layer 32. The lower cladding layer 31 may for example be a silicon oxide layer, such as an oxide layer of a SOI substrate. The upper cladding layer 32 may for example be a deposited silicon oxide layer.

In the optical modulation section 21 of the micro-ring (FIG. 2), the rib waveguide comprises an integrated PN junction formed by a P-type region 33 at a first lateral side of the strip portion 202 and an N-type region 34 at a second lateral side of the strip portion 202. The P-type region 33 and the N-type region 34 form a lateral PN junction that is located in the strip portion 202 of the micro-ring waveguide 20. The P-type region 33 and the N-type region 34 may for example be formed by ion implantation followed by annealing, e.g. Rapid Thermal Annealing, for dopant activation. The doping concentration in the P-type region 33 and in the N-type region 34 may for example be in the order of $10^{18}$ $cm^{-3}$, the present disclosure not being limited thereto.

In embodiments of the present disclosure, the location of the PN junction in the strip portion 202 may be at substantially the same lateral position along the length of the optical modulation section 21. In other embodiments of the present disclosure, the location of the PN junction in the strip portion 202 may vary along the length of the optical modulation section 21: the PN junction may for example be interdigitated.

As illustrated in FIG. 2, the micro-ring also contains a P-type contact 37 and an N-type contact 38, to enable tuning of the effective refractive index in the optical modulation section 21 by depleting the PN junction (reverse biasing) inside the micro-ring waveguide 20. A heavily doped $P^+$ region 35 and a heavily doped $N^+$ region 36 are formed in the silicon layer at the location of respectively the P-type contact 37 and the N-type contact 38 to enable the formation of good ohmic contacts. The $P^+$-type region and the $N^+$-type region may for example be formed by ion implantation followed by annealing, e.g. Rapid Thermal Annealing, for dopant activation. The doping concentration in the $P^+$-type region and in the $N^+$-type region may for example be in the order of $10^{20}$ $cm^{-3}$, the present disclosure not being limited thereto. The P-type contact 37 may for example be electrically connected to the heavily doped $P^+$ region 35 though the upper cladding layer 32 by means of electrically conductive plugs 39. Similarly, the N-type contact 38 may for example be electrically connected to the heavily doped N+ region 36 though the upper cladding layer 32 by means of electrically conductive plugs 39.

Although in FIG. 2 the micro-ring waveguide shown is a rib waveguide, wherein an electrical path between the heavily doped $P^+$ region 35 (p-type contact 37) and the PN junction in the strip portion 202 of the waveguide and between the heavily doped $N^+$ region 36 (N-type contact 38) and the PN junction is established through the doped slab portions 201, the present disclosure is not limited thereto. For example, the micro-ring waveguide may be a strip waveguide, wherein an electrical path is established between the contacts and a PN junction in the strip waveguide by forming doped silicon bridges between the contact areas and the strip waveguide. Other suitable configurations may be used.

In the optical power monitoring section 22, schematically illustrated in FIG. 3, the rib waveguide comprises a P-type region 33 at a first lateral side of the strip portion 202, an N-type region 34 at a second lateral side of the strip portion, and a doping compensated region 40 between the P-type region 33 and the N-type region 34, the doping compensated region 40 being located in the strip portion 202. In this way a lateral PIN diode is formed, with the doping compensated, e.g. intrinsic, region located in the strip portion of the micro-ring. Although in the example illustrated in FIG. 3, the P-type region 33 and the N-type region 34 both extend into the strip portion of the micro-ring, the present disclosure is not limited thereto.

In embodiments of the present disclosure, the doping compensated region 40 is a region with a high defect density. This high defect density may for example be obtained by doping compensation. In embodiments of the present disclosure, the doping compensated region 40 may for example be formed as a result of the ion implantation steps that are used for forming the P-type region 33 and the N-type region 34 (both in the optical power monitoring section 22 and in the optical modulation section 21), by providing an overlap between both ion implantation windows. In other embodiments, the doping compensated region 40 may for example be formed as a result of the ion implantation steps that are performed for forming the P$^+$-type region 35 and the N$^+$-type region 36, by providing an overlap between both ion implantation windows. In still other embodiments an overlap between ion implantation windows may be provided for both the P-type and N-type implantation and the P$^+$-type and N$^+$-type implantation to form the compensated region 40.

By providing an overlap between the P-type (P$^+$-type) ion implantation window and the N-type (N$^+$-type) ion implantation window in the optical power monitoring section 22, in the strip portion 202 of the waveguide, the N-type dopants and the P-type dopants may at least partially, e.g. completely, compensate each other and a doping compensated region 40, such as for example an intrinsic region, may be formed. As a result, the free carrier concentration remains low in the doping compensated region 40, which eliminates undesired free carrier absorption. On the other hand, the density of lattice defects doubles in this region 40 due to the repeated ion implantations. The lattice defects result in defect states in the forbidden band of silicon. Through these states, photons at 1.55 μm whose energy is below the gap of the forbidden band may excite electrons from the valence band to the conduction band, which is well-known as defect mediated sub-bandgap absorption. Generally, the optical-to-electrical conversion quantum efficiency of the defect mediated absorption is proportional to the defect density.

It is a potential advantage of embodimens of the present disclosure that only existing ion implantation steps that are indispensable to implement a carrier-depletion based modulator may be used, so no additional processing steps are required.

In operation, when light propagates through the micro-ring 20, part of the propagating light is absorbed by defect mediated absorption in the power monitoring section 22 of the micro-ring. This absorption gives rise to a photocurrent that is a measure for the optical power inside the micro-ring. This photocurrent may be used as a feedback signal towards a feedback control circuit that adjusts the power of an integrated heater, so as to dynamically control the operation wavelength of the ring modulator.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out novel features of the disclosure as applied to various embodiments, it will be understood that various omissions, substitutions, and changes in the form and details of the device or process illustrated may be made by those skilled in the technology without departing from the disclosure.

The invention claimed is:

1. A carrier-depletion based silicon waveguide resonant cavity modulator comprising:
 a silicon waveguide based resonant cavity, wherein the resonant cavity includes an optical modulation section and an optical power monitoring section,
 wherein the optical power monitoring section includes an integrated lateral PIN diode including a doping compensated I-region having a high defect density,
 wherein the doping compensated I-region is formed by performing a P-type ion implantation in the I-region and an N-type ion implantation in the I-region.

2. The carrier-depletion based silicon waveguide resonant cavity modulator according to claim 1, wherein the lateral PIN diode comprises a P-doped region having a net P-type doping concentration, an N-doped region having a net N-type doping concentration, and the doping compensated I-region is between the P-doped region and the N-doped region, wherein the I-region has a net doping concentration that is lower than the net P-type doping concentration and lower than the net N-type concentration.

3. The carrier-depletion based silicon waveguide resonant cavity modulator according to claim 2, wherein the doping compensated region is an intrinsic region.

4. The carrier-depletion based silicon waveguide resonant cavity modulator according to claim 3, wherein the resonant cavity includes a micro-ring resonator.

5. The carrier-depletion based silicon waveguide resonant cavity modulator according to claim 3, wherein the resonant cavity comprises a Fabry-Pérot cavity.

6. The carrier-depletion based silicon waveguide resonant cavity modulator according to claim 4, wherein micro-ring resonator includes an etched portion and an unetched portion, and wherein P-doped region, the N-doped region, and the I-region extend into the unetched portion.

7. The carrier-depletion based silicon waveguide resonant cavity modulator according to claim 4, wherein the optical modulation section includes an integrated PN junction formed by a second P-doped region and a second N-doped region.

8. The carrier-depletion based silicon waveguide resonant cavity modulator according to claim 7, wherein micro-ring resonator includes an etched portion and an unetched portion, and wherein the PN junction formed by the second P-doped region and the second N-doped region is disposed in the unetched portion.

9. The carrier-depletion based silicon waveguide resonant cavity modulator according to claim 8, wherein first P-doped region, the first N-doped region, and the I-region extend into the unetched portion.

* * * * *